United States Patent [19]

Ohtake et al.

[11] Patent Number: 4,878,973
[45] Date of Patent: Nov. 7, 1989

[54] PROCESS FOR PRODUCING A THIN RESIN FILM

[75] Inventors: Etsuo Ohtake, Kanagawa; Kaoru Yamaki; Takayuki Kuroda, both of Hyogo, all of Japan

[73] Assignee: Daicel Chemical Industries, Ltd., Osaka, Japan

[21] Appl. No.: 767,239

[22] Filed: Aug. 19, 1985

Related U.S. Application Data

[63] Continuation of Ser. No. 504,752, Jun. 15, 1983, abandoned.

[30] Foreign Application Priority Data

Jun. 15, 1982 [JP] Japan ................................ 57-103488

[51] Int. Cl.$^4$ .......................... B29D 7/01; B32B 31/04
[52] U.S. Cl. .......................................... 156/85; 156/86; 156/108; 264/1.7; 264/2.1; 264/311; 264/330
[58] Field of Search ................. 264/2.1, 311, 1.7, 330; 156/85, 86, 108

[56] References Cited

U.S. PATENT DOCUMENTS 4,246,054 1/1981 Nester .................................. 264/311
4,536,240 8/1985 Winn .................................... 264/2.1

Primary Examiner—James Lowe
Attorney, Agent, or Firm—Sughrue, Mion, Zinn, Macpeak & Seas

[57] ABSTRACT

A process for producing a thin film of unoriented cellulose ester held under uniform tension, the process including the steps of: casting a solution of cellulose ester in an organic solvent over a smooth glass plate and thereafter removing the solvent to form a thin film of a uniform thickness on the glass plate; permitting the thin film to separate from the glass plate by immersing the same into water; and recovering the thin film from the water and setting the wet film on a supporting mount, followed by drying the same.

10 Claims, 2 Drawing Sheets

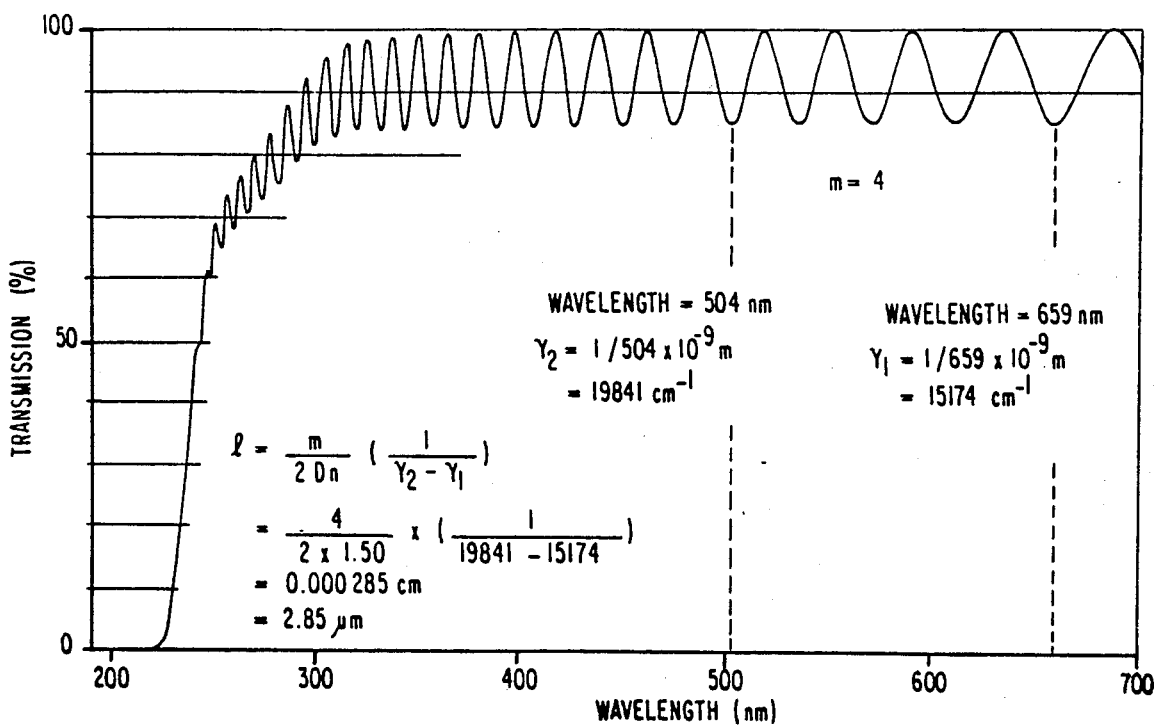
FIG. 7
FIG. 8
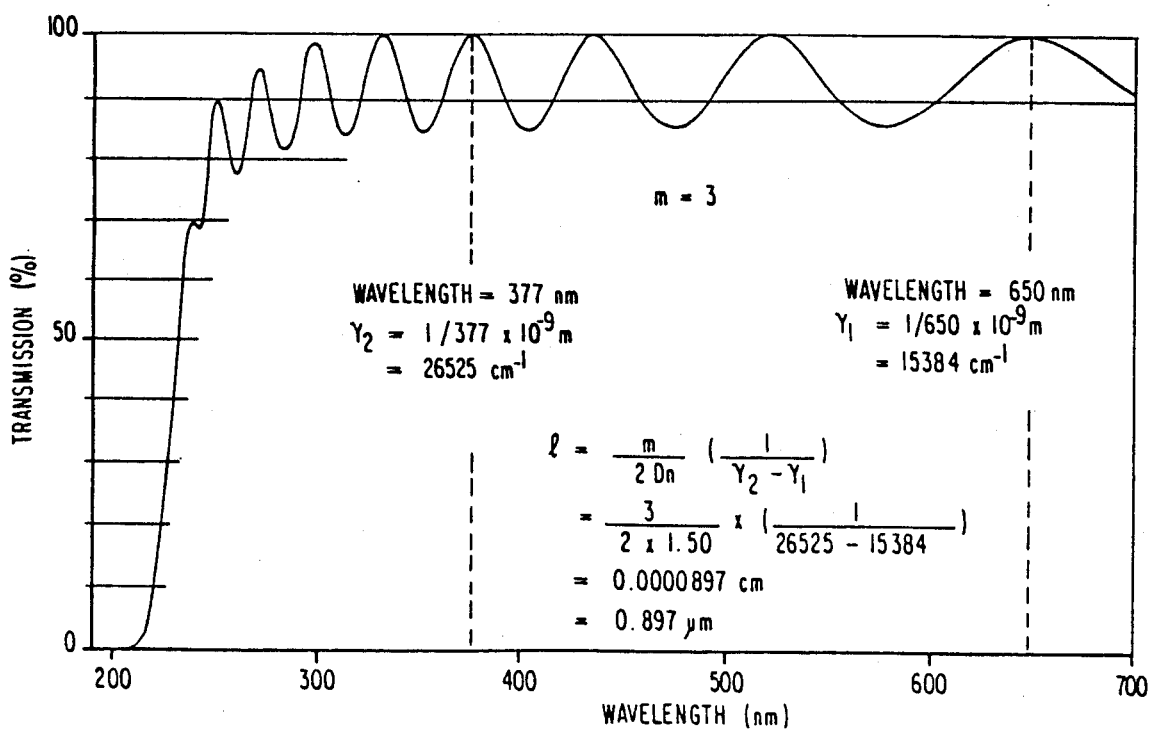

PROCESS FOR PRODUCING A THIN RESIN FILM

This is a continuation of Ser. No. 06/504752, filed June 15, 1983 and now abandoned.

FIELD OF THE INVENTION

The present invention relates to a process for producing a thin resin film used to protect a photomask during lithographic processing.

BACKGROUND OF THE INVENTION

Photomasking using UV radiation as a light source achieves high resolution and productivity in the manufacture of ICs by lithography. This technique is especially adapted to the production of wafers or chips of higher packing density. "Deep" UV radiation is commonly employed as a light source because the resolution is increased as the wavelength of light is decreased. Because high resolution is achieved by photomasking, the smallest contaminant on the image surface of the photomask reduces the accuracy of the etched image to yield a defective product. The contaminant could be removed by cleaning, but this operation itself is deleterious to the photomask and shortens its service life.

Conventionally, the image on the photomask is protected from contaminants in the air by a thin resin film placed in the optical path on the image surface of the photomask. Any contaminants in the air build up on the surface of the thin resin film instead of on the image surface of the photomask. If the thickness of the resin film and the distance between the resin film and the image on the photomask remain the same at every point of the film, the harmful effect of any contaminants on the thin film on the surface of the photoresist is avoided so as to provide a faithful pattern on the resist after exposure. The thin film for protecting photomasks is therefore very useful in the semiconductor industry, but no commercial method for producing such protective film has yet been established.

SUMMARY OF THE INVENTION

As a result of various studies to develop a reliable and effective method for producing a thin resin film adapted for the protection of photomasks, we found that this object can be attained by a process which comprises casting a cellulose ester into a thin film on a substrate, recovering the thin film from water, stretching the film across a supporting mount while the film is partially wet, and subsequently drying the film.

BRIEF DESCRIPTION OF THE DRAWINGS

FIG. 4 is a cross sectional view of the square supporting mount.

FIGS. 7 and 8 show spectra for measuring the film thickness of the films prepared in Examples 3 and 4, respectively.

DESCRIPTION OF PREFERRED EMBODIMENTS

Figure 1:
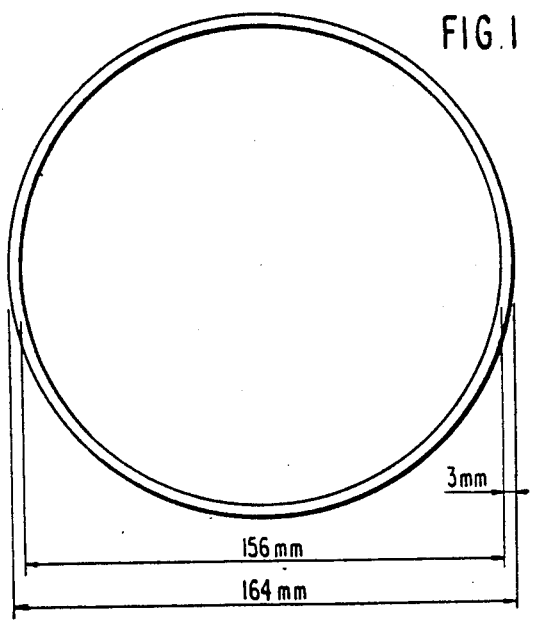
FIG. 1 is a plan view of a circular frame (made of aluminum or steel (SUS 304)) for recovering a film from water.

The material from which a thin resin film is prepared by the process of the present invention must meet the following requirements: (1) it has minimum absorption of light in the spectral region used for exposure (the UV region in particular); (2) it provides a thin film that has adequate strength which will not creep or shrink after it is placed on the supporting mount; (3) it does not have any crystallinity or orientation that causes directional light transmission. To satisfy these requirements, the process used to produce the desired film must fulfill the following requirements: (1) it provides a thin film having a uniform thickness; (2) it provides a thin film having the necessary thickness; (3) it produces a thin film which can be retained on a supporting mount under uniform tension; (4) it does not yield an oriented film either during the film making or during the stretching on the supportive mount.

According to the present invention, cellulose esters are used as materials from which a thin resin film is prepared. Illustrative cellulose esters are cellulose nitrate, cellulose acetate, cellulose propionate and cellulose butyrate acetae. Cellulose nitrate is particularly suitable for the purpose of the present invention.

An unoriented thin film can be produced from cellulose esters by the "casting" technique. Cellulose esters easily dissolve in solvents having relatively low boiling points such as lower aliphatic acid esters and ketones, and the desired film thickness can be obtained by specifying the concentration of the solution and the thickness of the film cast from the solution. Thin films for protecting photomasks commonly have a thickness of $2.8 \pm 0.3$ µm or $4.5 \pm 0.3$ µm.

The solvents for the cellulose ester used in a spin casting preferably have boiling points of at least 100° C. such as lower aliphatic acid esters and ketones. Examples of the solvents include butyl acetate, isobutyl acetate and cyclohexanone. Examples of solvents for the cellulose ester used in a conventional casting include methyl ethyl ketone and methylene chloride in addition to the above butyl acetate, isobutyl acetate and cyclohexanone. Auxiliary solvents may be used together with the above solvents and examples of the auxiliary solvents include toluene, methanol and ethylene glycol acetate monomethyl ether. The concentration of the cellulose ester in the solvent is preferably 3 to 8 wt%.

According to the present invention, the solution of the cellulose ester is cast onto a smooth glass plate, and after removing the solvent, the glass plate is immersed in water (at about 15°–70° C.) at ambient pressure for about 30 minutes, whereupon the thin film of cellulose ester detaches itself from the glass plate. The glass plate used for casting has a smoothness such that undulation of the glass surface is less than 10 µm per 10 cm × 10 cm of surface area. Thereafter, the film can be readily recovered from the water. The film is then placed on a supporting mount, and while it is partially dry, a small amount of a volatile solvent (for example, isopropyl acetate) is applied to the interface between the supporting mount and the film along the periphery of the film. The solvent provides intimate content between the film and the mount after a short period of drying. Subsequently the resulting film is dried by setting the film together with the mount onto a spinner and rotating it at 100 rpm for 2–3 minutes to remove water away and followed by drying at 50° C. During the drying, the film shrinks very slightly but in an amount sufficient to hold the resulting film under a uniformly tensioned state so that the film has no bending, wrinkle, distortion and so on, which can be observed by the presence or absence of interference fringes by the naked eye. The degree of shrinkage of the film can not be measured. However, when a wet cellulose ester film is dried without load, the film shrinks by several percent. Thus, since the film of the present invention is placed on the mount, an estimate of the degree of shrinkage by drying would be less than 1%.

The thickness of the resulting film is calculated from the following equation using the spectrum thereof, for example, as shown in FIGS. 7 and 8.

$$l = \frac{m}{2\,Dn}\left(\frac{1}{\gamma_2 - \gamma_1}\right)$$

$l$: film thickness (cm)
$m$: order of interference (i.e., number of waves between $\gamma_1$ and $\gamma_2$)
$Dn$: refractive index of cellulose ester (for example, the refractive index of nitro-cellulose using the $D$-line of sodium is 1.50)

$\left.\begin{array}{c}\gamma_2 \\ \gamma_1\end{array}\right\}$ frequency obtained from peak of waves Cellulose nitrate and other cellulose esters are good optical materials that are highly transparent and have minimum light absorption in the UV region. The esters have a low degree of crystallinity but their molecular structures are rigid and they exhibit dimensional stability after shaping. The cellulose esters permit the use of a wide variety of casting solvents, and thin films of these esters do not firmly adhere to a glass plate and can be easily recovered without applying any mechanical force. The films swell very slightly when they are put in water. The present invention achieves its object by making the best use of these features of cellulose esters.

It is generally known that the processability of cellulose esters can be improved with the use of plasticizers, but for the purpose of the present invention, the use of plasticizers is not recommended since they increase light absorption in the UV region, provide greater adhesion to the glass surface, and cause increased creep in thin films of the esters.

In short, the present invention relates to a process for producing a thin resin film which includes the steps of: casting a solution of a cellulose ester in an organic solvent over a smooth glass plate and thereafter removing the solvent to form a thin film of uniform thickness on the glass plate; permitting the thin film to separate from the glass plate by immersing the same into water; and recovering the thin film from the water and setting the wet film on a supporting mount, followed by drying the same.

The present invention is hereunder described in greater detail by reference to examples.

EXAMPLE 1

Figure 3:
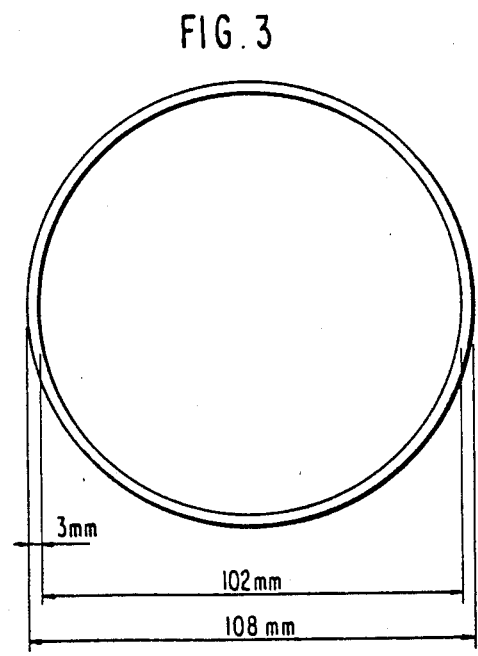
FIG. 3 is a plan view of a circular aluminum supporting mount.
Figure 2:
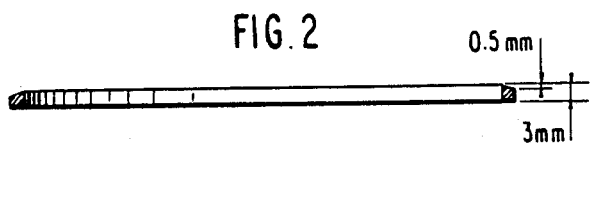
FIG. 2 is a cross sectional view of the circular frame.
Figure 4:
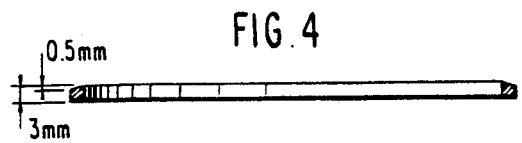
FIG. 4 is a cross sectional view of the circular supporting mount.
Figure 5:
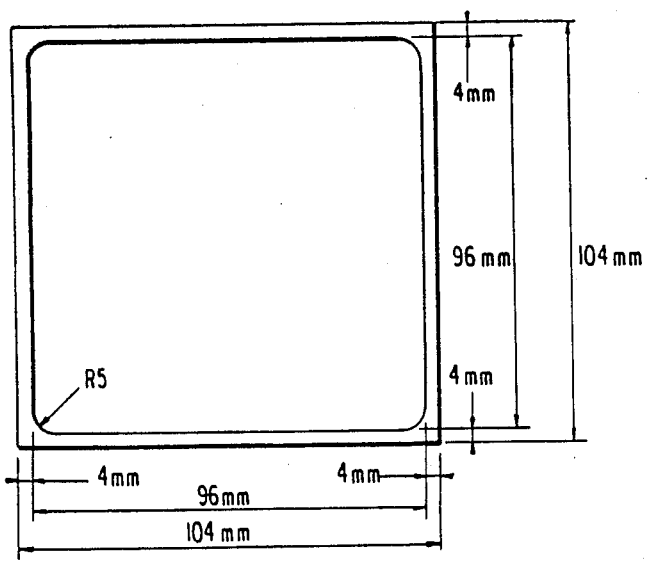
FIG. 5 is a plan view of a square aluminum supporting mount.
Figure 6:

A nitrocellulose dope consisting of 64 g of nitrocellulose (RS-5 nitrocellulose wetted with isopropanol; produced by Daicel Chemical Industries, Ltd.; solids cont.=70%), 146 g of methyl ethyl ketone, 120 g of butyl acetate and 120 g of toluene was applied to a smooth glass plate with a bar coater (clearance: 50 μm), and dried at 20° C. for 24 hours, then at 60° C. for 1 hour. The glass plate with a thin film of cellulose nitrate was gently immersed in clean water. A few minutes later, the film detached itself from the glass plate and was recovered from the water with a circular aluminum frame dia.=ca. 150 mm, see FIGS. 1 and 2), with care taken not to break the film. The film was then transferred onto the top of an aluminum supporting mount (ID: 100 mm, OD: 110 mm, thickness: 10 mm, see FIGS. 3 and 4). A small amount of methyl ethyl ketone was applied to the interface between the film and the mount along the periphery of the film, and, upon air drying, the film intimately adhered to the mount. After trimming the part of the film extending beyond the mount, the film on the mount was dried at 60° C. for 3 hours to form a cellulose nitrate film 3 μm thick (specific gravity: 1.6) that was retained under uniform tension.

The thickness of the supporting mount provides a spacer that defines a clearance in the optical path between the image on the photomask and the thin resin film.

EXAMPLE 2

A cellulose acetate film was prepared by repeating the procedure of Example 1 except that the nitrocellulose dope was replaced by the combination of 60 g of acetylcellulose LT-105 (produced by Daicel Chemical Industries, Ltd.), 846 g of methylene chloride and 94 g of methanol. The thickness of the cast film was 50 μm and a 9:1 mixture of methylene chloride and methanol was used to provide an intimate bond between the supporting mount and the film. The film as the final product had a thickness of 3 μm (specific gravity: 1.3) and was retained on the mount under uniform tension.

EXAMPLE 3

A nitrocellulose dope consisting of 20 g of nitrocellulose RS-7 (nitrocellulose wetted with isopropanol; produced by Daicel Chemical Industries, Ltd.; solids cont.=70%), 50 g of butyl acetate, 50 g of isobutyl acetate and 90 g of cyclohexane was prepared. The resulting dope had a viscosity of 480 cp at 23° C. A film was prepared using the resulting dope by a spin coating method as follows. A spinner was set to a glass plate and was rotated at 70 rpm. The above dope was dropped on the center of rotation of the spinner for 5 seconds. Immediately after dropping, the rotation speed of the spinner was increased to 1050 rpm in 0.2 seconds and was kept at this rotation speed for 15 seconds. During this step, the dope was centrifugally cast on the glass plate. After the designated period described above rotation was stopped. The glass plate with a thin film of cellulose nitrate was removed from the spinner and was gently dried at 23° C. and 60% RH for 24 hours, then 60° C. for 1 hour. In accordance with the same procedure of Example 1, the glass plate with a thin film was immersed in water, and the film detached from the glass plate was recovered from the water and transferred onto the top of an aluminum supporting mount. The resulting film on the mount was dried at 60° C. for 3 hours to form a cellulose nitrate film having an average thickness of 2.85 μm and an unevenness in thickness of less than 0.03 μm that was held under uniform tension through all directions. (see, FIG. 7)

EXAMPLE 4

A nitrocellulose dope consisting of 10 g of nitrocellulose RS-120 (nitrocellulose wetted with isopropanol; produced by Daicel Chemical Industries, Ltd.; solid cont.=70%), 47.6 g of butyl acetate, 47.6 g of isobutyl acetate and 94.8 g of cyclohexane was prepared. The resulting dope had a viscosity of 300 cp at 23° C. The same procedure as Example 3 was repeated except that the spinner during centrifugal casting was rotated at 780 rpm instead of 1050 rpm. Thereby, a cellulose nitrate film having an average thickness of 0.90 μm and an unevenness in thickness of less than 0.005 μm was formed on the mount under uniform tension. (see, FIG. 8)

EXAMPLE 5

An acetylcellulose dope consisting of 18.5 g of acetylcellulose L-20 (produced by Daicel Chemical Industries, Ltd.; percent of weight loss on drying: 5%), 91.2 g of ethyleneglycol acetate monomethyl ether, 45.6 g of cyclohexane, 22.8 g of butyl acetate and 22.8 g of isobutyl acetate was prepared. The resulting dope had a viscosity of 550 cp at 23° C. The same procedure as Example 3 was repeated except that the dope was dropped on the spinner rotated at 200 rpm for 7 seconds and the spinner during centrifugal casting was rotated at 850 rpm. Thereby, an acetylcellulose film having an average thickness of 2.90 μm and an unevenness in thickness of less than 0.02 μm was formed on the mount under uniform tension.

While the invention has been described in detail and with reference to specific embodiment thereof, it will be apparent to one skilled in the art that various changes and modifictions can be made therein without departing from the spirit and scope thereof.

What is claimed is:

1. A process for producing a transparent thin film of unoriented cellulose ester held under uniform tension, the process including the steps of:

casting a solution of cellulose ester in an organic solvent free from plasticizer over a smooth glass plate and thereafter removing the solvent to form a transparent thin film of a uniform thickness on the glass plate;

permitting the transparent thin film to separate from the glass plate by immersing the same into water; and recovering the transparent thin film from the water and setting and subsequently bonding the moist film on a supporting mount, followed by drying the same.

2. A process according to claim 1, wherein said cellulose ester is cellulose nitrate.

3. A process according to claim 1, wherein said supporting mount contacts the thin film only at the periphery thereof.

4. A process according to claim 3, wherein said thin film is highly transparent and has a minimum absorption of light in the ultra-violet region.

5. A process according to claim 4, wherein the glass plate has a smoothness such that undulation of the glass surface is less than 10μ per 10 cm×10 cm of surface area.

6. A process according to claim 4, wherein the wet film is dried by setting the same onto the supporting mount, spinning the same to remove water and they drying at 50° C.

7. A process according to claim 1, wherein during the drying, the film shrinks slightly but in an amount sufficient to hold the resulting film under the uniform tension so that the film has no bending, wrinkling or distortion and the presence or absence of interference fringes can be observed by the naked eye.

8. A process according to claim 1, wherein the solution of cellulose ester in an organic solvent consists essentially of cellulose ester and an organic solvent.

9. A process as in claim 1, wherein the transparent thin film of unoriented cellulose ester has a thickness of 2.8±0.3 μm.

10. A process as in claim 1, wherein the transparent thin film of unoriented cellulose ester has a thickness of 0.09 μm±0.005μ.

* * * * *

UNITED STATES PATENT AND TRADEMARK OFFICE
CERTIFICATE OF CORRECTION

PATENT NO. : 4,878,973

DATED : Nov. 7, 1989

INVENTOR(S) : Etsuo Ohtake; Kaoru Yamaki; Takayuki Kuroda

It is certified that error appears in the above-identified patent and that said Letters Patent is hereby corrected as shown below:

Col. 5, line 23, delete "0.02 $\mu$m" and insert --0.03 $\mu$m--.

Signed and Sealed this

Third Day of March, 1992

Attest:

HARRY F. MANBECK, JR.

*Attesting Officer*      *Commissioner of Patents and Trademarks*